US011451989B2

(12) United States Patent
Siomina et al.

(10) Patent No.: US 11,451,989 B2
(45) Date of Patent: Sep. 20, 2022

(54) METHODS AND RADIO NODES FOR PERFORMING MEASUREMENT WITH MULTIPLE NUMEROLOGIES

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/346,043

(22) PCT Filed: Nov. 2, 2017

(86) PCT No.: PCT/IB2017/056833
§ 371 (c)(1),
(2) Date: Apr. 29, 2019

(87) PCT Pub. No.: WO2018/083629
PCT Pub. Date: May 11, 2018

(65) Prior Publication Data
US 2019/0320337 A1    Oct. 17, 2019

Related U.S. Application Data

(60) Provisional application No. 62/416,932, filed on Nov. 3, 2016.

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0082* (2013.01); *H04L 5/0094* (2013.01); *H04L 27/2607* (2013.01); *H04W 8/22* (2013.01)

(58) Field of Classification Search
CPC ...... H04W 24/10; H04W 8/22; H04L 5/0082; H04L 5/0094
(Continued)

(56) References Cited

U.S. PATENT DOCUMENTS

2009/0005042 A1    1/2009  Bi
2017/0118054 A1*   4/2017  Ma .................. H04L 5/0064
(Continued)

FOREIGN PATENT DOCUMENTS

EP    2879445 A1    6/2015
EP    3282632 A1    2/2018
(Continued)

OTHER PUBLICATIONS

3GPP TSG-RAN WG2 Meeting #95, "Capability Coordination across RATs", R2-165644 (Year: 2016).*
(Continued)

*Primary Examiner* — Yemane Mesfin
*Assistant Examiner* — Intekhaab A Siddiquee

(57) ABSTRACT

A method in a first radio node for performing measurements in a communication network is provided. The method comprises: performing a first amount of measurements on a first signal based on a first numerology; and performing a second amount of measurements on a second signal based on a second numerology; wherein performing the first and second amounts of measurements is based on a relation between the first and second amounts of measurements. The first radio node for carrying this method is also provided. The first radio node could be a wireless device, for example.

20 Claims, 13 Drawing Sheets

(51) Int. Cl.
*H04L 27/26* (2006.01)
*H04W 8/22* (2009.01)

(58) Field of Classification Search
USPC .......................................................... 370/329
See application file for complete search history.

(56) References Cited

U.S. PATENT DOCUMENTS

| 2018/0049047 A1* | 2/2018 | Lin ....................... H04W 24/02 |
| 2018/0103474 A1* | 4/2018 | Nurminen ......... H04W 72/0453 |
| 2020/0154326 A1* | 5/2020 | Deenoo ................ H04W 74/02 |

FOREIGN PATENT DOCUMENTS

| WO | 2015/109153 A1 | 7/2015 |
| WO | 2015/190967 A1 | 12/2015 |
| WO | 2017/184837 A1 | 10/2017 |
| WO | 2017/217719 A1 | 12/2017 |

OTHER PUBLICATIONS

3GPP TSG RAN WG2 #95bis, "Enhancement of LCP for Supporting Multiple Numerologies in NR",R2-166469 (Year: 2016).*
U.S. Appl. No. 62/406,064 (Year: 2016).*
Ericsson, On RRM requirements for NR, R4-168036, 3GPP TSG RAN WG4 Meeting #80-bis, Ljubljana, Slovenia, Oct. 10-14, 2016, 4 pages.
Huawei et al., RRC Support of Multiple Numerologies, R2-166205, 3GPP TSG-RAN WG2 Meeting #95bis, Kaohsiung, Oct. 10-14, 2016, 2 pages.
Qualcomm Incorporated, Capability Coordination across RATs, R2-165644, 3GPP TSG-RAN WG2 Meeting #95, Gothenburg, SE, Aug. 22-26, 2016, 6 pages.
Ericsson, On measurement capacity in NR, R4-1705609, 3GPP TSG RAN WG4 Meeting #83, Hangzhou, P. R of China, May 15-19, 2017, 4 pages.
ISR and Written Opinion from corresponding application PCT/IB2017/056833.

* cited by examiner

Shared

Centralized

Example Subcarrier Spacing candidate configurations for NR

METHODS AND RADIO NODES FOR PERFORMING MEASUREMENT WITH MULTIPLE NUMEROLOGIES

RELATED APPLICATIONS

The present application claims the benefits of priority of U.S. Provisional Patent Application No. 62/416,932, entitled "Methods and Radio Nodes for Controlling Measurement Capability with Multiple Numerologies" filed at the United States Patent and Trademark Office on Nov. 3, 2016, the content of which is incorporated herein by reference.

TECHNICAL FIELD

The present disclosure relates to methods and radio nodes for controlling measurement capability and performing measurements with multiple numerologies in radio communication networks.

BACKGROUND

NR Architecture

New Radio (NR) (also known as 5 Generation (5G) or Next Generation) architecture is being discussed in Third Generation Partnership (3GPP) standards organization. The current NR concept is illustrated in FIG. 1, where eNB denotes Long Term Evolution (LTE) eNodeB, gNB denotes NR base station (BS) (one NR BS may correspond to one or more transmission/reception points), and the lines between the nodes illustrate the corresponding interfaces which are under discussion in 3GPP. FIGS. 2A-2D illustrate example deployment scenarios with NR BS which are being discussed in 3GPP. FIG. 2a illustrates a non-centralized deployment scenario, FIG. 2b illustrates a co-sited deployment scenario, FIG. 2c illustrates a centralized deployment scenario, and FIG. 2d illustrates a shared deployment scenario.

Multi-Antenna Schemes in NR

Multi-antenna schemes for NR are currently being discussed in 3GPP. For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore, MIMO schemes for NR are also called massive MIMO. For around 30/70 GHz, up to 256 Transmit (Tx) and Receive (Rx) antenna elements are assumed. Extension to support 1024Tx at 70 GHz is agreed and it is under discussion for 30 GHz. For sub-6 GHz communication, to obtain more beamforming and multiplexing gain by increasing the number of antenna elements is also a trend.

With massive MIMO, three approaches to beamforming have been discussed: analog, digital, and hybrid (a combination of the two). The analog beamforming would compensate high path loss in NR scenarios, while digital precoding would provide additional performance gains similar to MIMO for sub-6 GHz necessary to achieve a reasonable coverage. The implementation complexity of analog beamforming is significantly less than digital precoding since it is in many implementations and relies on simple phase shifters, but the drawbacks are its limitation in multi-direction flexibility (i.e., a single beam can be formed at a time and the beams are then switched in time domain), only wideband transmissions (i.e., not possible to transmit over a subband), unavoidable inaccuracies in the analog domain, etc. Digital beamforming (requiring costly converters to/from the digital domain from/to IF domain), used today in LTE, provides the best performance in terms of data rate and multiplexing capabilities (multiple beams over multiple subbands at a time can be formed), but at the same time it is challenging in terms of power consumption, integration, and cost; in addition to that the gains do not scale linearly with the number of transmit/receive units while the cost is growing rapidly. Supporting hybrid beamforming, to benefit from cost-efficient analog beamforming and high-capacity digital beamforming, is therefore desirable for NR. An example diagram for hybrid beamforming is shown in FIG. 3. Beamforming can be on transmission beams and/or reception beams, network side or UE side.

Beam Sweeping

The analog beam of a subarray can be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently steered beams can be transmitted through subarrays, can be assigned and periodically transmitted. For example, FIG. 4a illustrates Tx beam sweeping on 2 subarrays and FIG. 4b illustrates Tx beam sweeping on 3 subarrays.

Numerology

For LTE, the term "numerology" includes, e.g., the following elements: frame duration, subframe or TTI duration, slot duration, subcarrier spacing, cyclic prefix length, number of subcarriers per RB, number of RBs within the bandwidth (different numerologies may result in different numbers of RBs within the same bandwidth), number of symbols within a certain time unit e.g. 1 ms subframe, symbol length, etc.

The exact values for the numerology elements in different radio access technologies are typically driven by performance targets, e.g., performance requirements impose constraints on usable subcarrier spacing sizes, e.g., the maximum acceptable phase noise sets the minimum subcarrier bandwidth while the slow decay of the spectrum (impacting filtering complexity and guard band sizes) favors smaller subcarrier bandwidth for a given carrier frequency, and the required cyclic prefix sets the maximum subcarrier bandwidth for a given carrier frequency to keep overhead low.

However, the numerology used so far in the existing RATs is rather static and typically can be trivially derived by the UE, e.g., by one-to-one mapping to RAT, frequency band, service type (e.g., MBMS), etc.

In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers.

The support of multiple numerologies has been agreed for NR, which can be multiplexed in the frequency and/or time domain for the same or different UEs.

In NR which is to be based on OFDM, multiple numerologies will be supported for general operation. A scaling approach (based on a scaling factor $2^n$, $n \in \mathbb{N}_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of ($2^m*15$) kHz gives exactly $1/2^m$ 0.5 ms for a slot that is 0.5 ms in the 15 kHz numerology.

Subcarrier spacings of at least up to 480 kHz are currently being discussed for NR (the highest discussed values correspond to millimeter-wave based technologies). It was also agreed that multiplexing different numerologies within a same NR carrier bandwidth is supported, and FDM and/or TDM multiplexing can be considered. It was further agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies. In FIG. 5, some candidate carrier spacings are illustrated with respect to the frequency and cell range. In Table 1, further details are provided on corresponding time durations for some candidate carrier spacings.

TABLE 1

Different OFDM numerologies

| Subcarrier spacing in kHz | OFDM symbol duration in µs | Cyclic prefix length in µs | Total symbol duration in µs |
| --- | --- | --- | --- |
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

There are still many aspects to be considered for using different numerologies in a communication system.

SUMMARY

At least the following problems may be envisioned: the current UE measurement capability is defined as the minimum number of measured cells, and there is no capability accounting for measurements with different numerology.

Certain aspects and their embodiments of the present disclosure may provide solutions to these or other problems.

In the following, the term 'optional' is used to characterize features (e.g. steps or structures), that may be present in some, but not all embodiments of certain proposed aspects.

Embodiments of this disclosure allow a radio node to maintain a combined capability comprising a first amount of measurements based on a first numerology and a second amount of measurements based on a second numerology.

In a first aspect, there is provided a method in a first radio node (e.g., UE or a radio network node) for performing measurements in a communication network. The method comprises: performing a first amount of measurements on a first signal based on a first numerology; and performing a second amount of measurements on a second signal based on a second numerology; wherein performing the first and second amounts of measurements is based on a relation between the first and second amounts of measurements.

According to a second aspect, there is provided a first radio node for performing measurements in a communication network. The first radio node comprises a processing circuitry configured to: perform a first amount of measurements on a first signal based on a first numerology; and perform a second amount of measurements on a second signal based on a second numerology; wherein performing the first and second amounts of measurements is based on a relation between the first and second amounts of measurements.

According to a third aspect, there is provided a method in a second radio node for controlling measurements in a communication network. The method comprises: obtaining for a first radio node a combined capability for performing a first amount of measurements on a first signal based on a first numerology and a second amount of measurements on a second signal based on a second numerology, the combined capability comprising a relation between the first and the second numerologies; and adapting the first radio node's measurements, based on the obtained combined capability.

In a fourth aspect, there is provided a second node for controlling measurements in a communication network. The second node comprises a processing circuitry configured to: obtain for a first radio node a combined capability for performing a first amount of measurements on a first signal based on a first numerology and a second amount of measurements on a second signal based on a second numerology, the combined capability comprising a relation between the first and the second numerologies; and adapt the first radio node's measurements, based on the obtained combined capability.

For example, the circuitry may include one or more processors and memory. The radio nodes are operable to perform steps according to embodiments of methods disclosed herein, according to the various aspects.

According to further aspects, computer programs, computer readable media configured to process and/or store instructions for steps according to embodiments of methods disclosed herein, according to the various aspects, are also provided.

Certain embodiments of aspects of the present disclosure may provide one or more technical advantages, including:

Possibility to control the combined capability of a radio node.

Possibility to efficiently control radio node's resources based on its capability.

Possibility to adapt second radio node's transmission configuration, based on the capability of UEs.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

Figure 1:
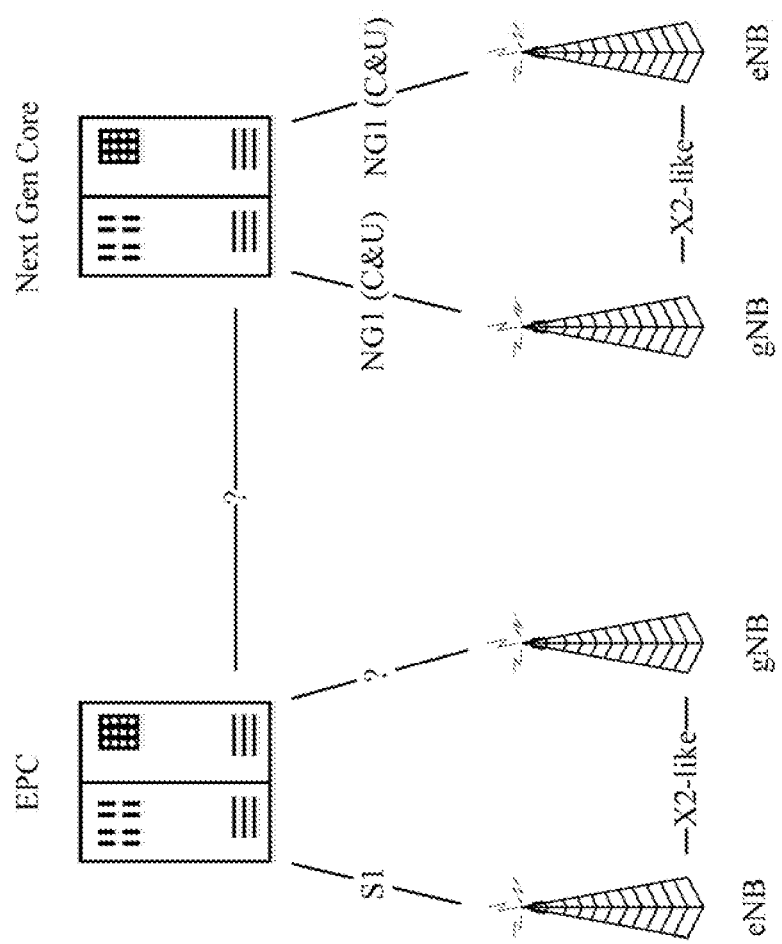
FIG. 1 is a schematic illustration of Next Radio (NR) architecture.
Figure 2B:
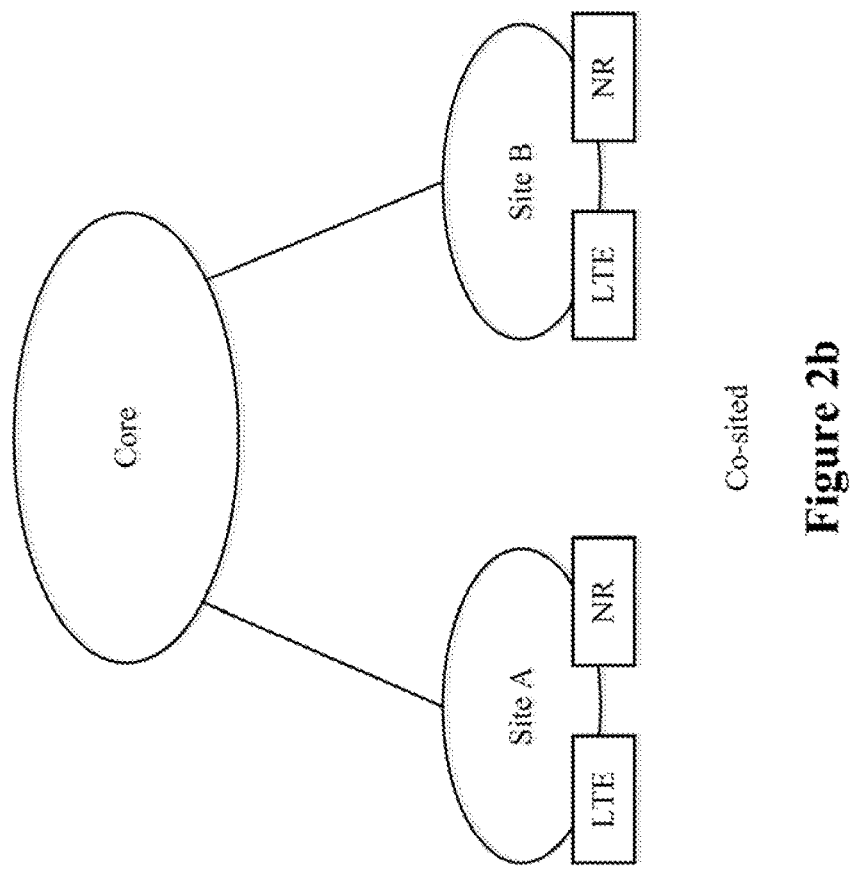
FIGS. 2a to 2d are diagram illustrating different NR deployment examples.
Figure 2A:
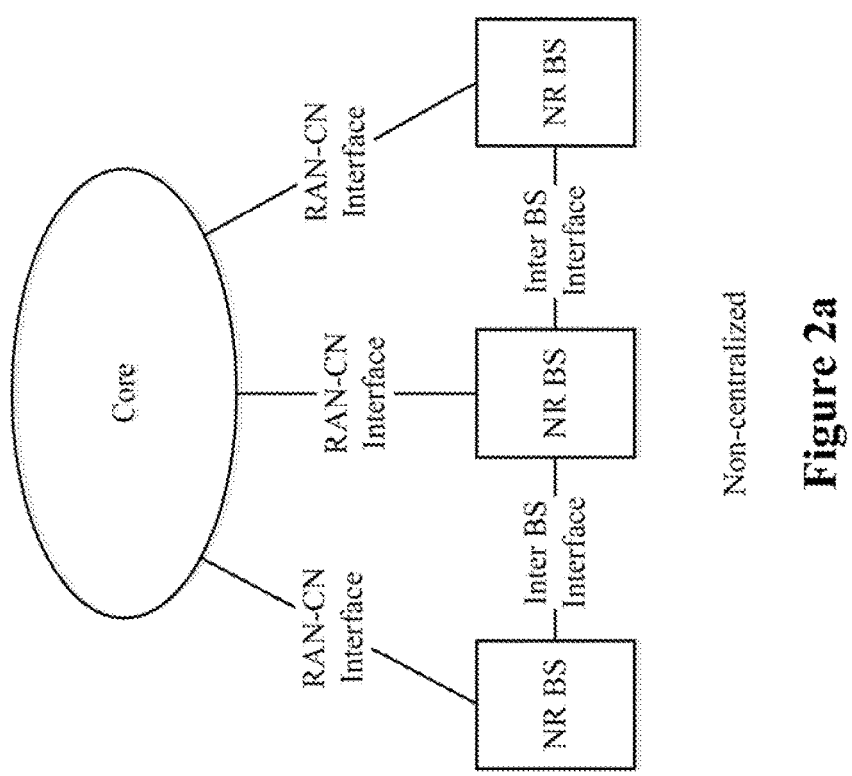
Figure 2D:
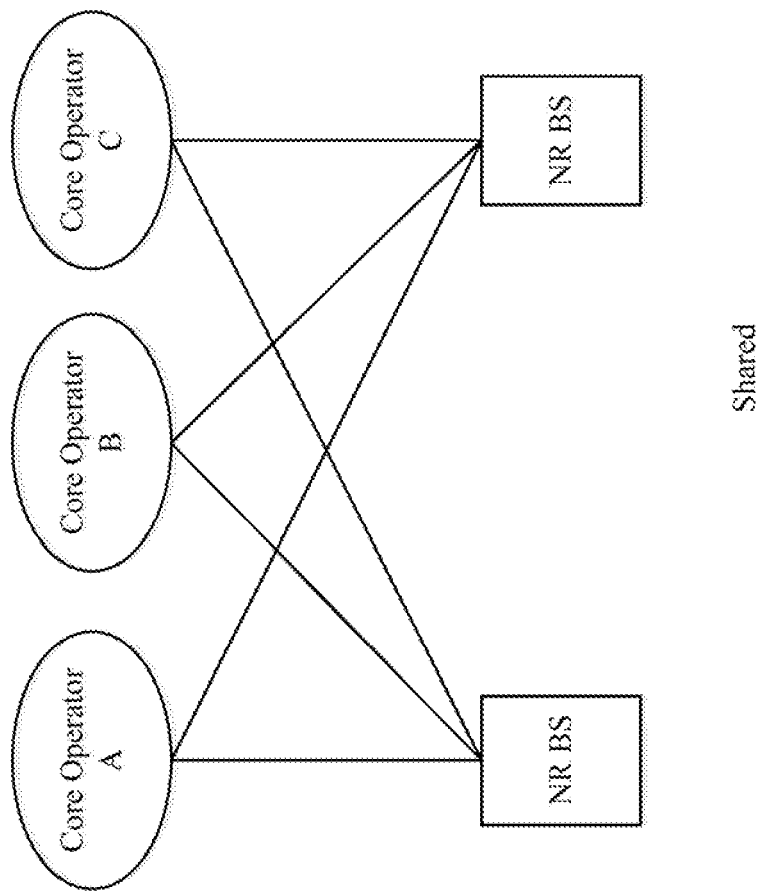
Figure 2C:
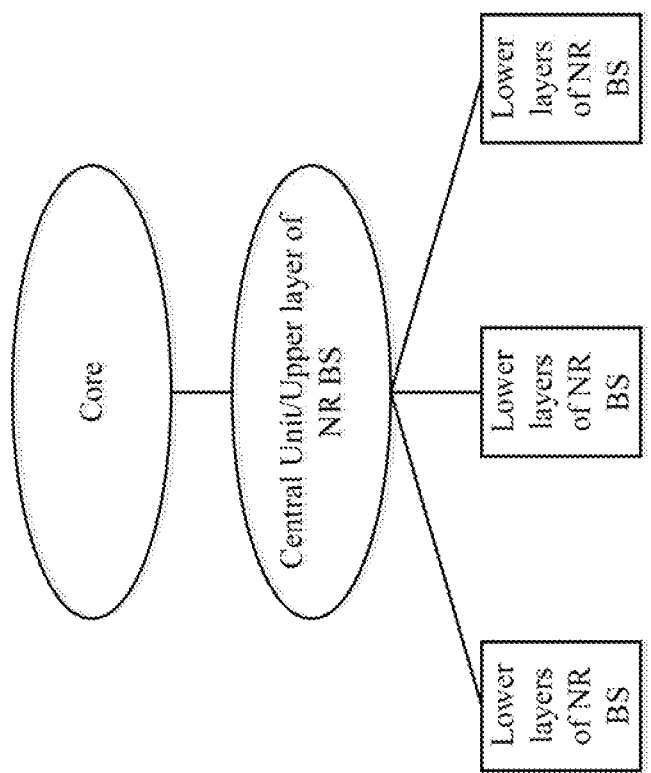
Figure 3:
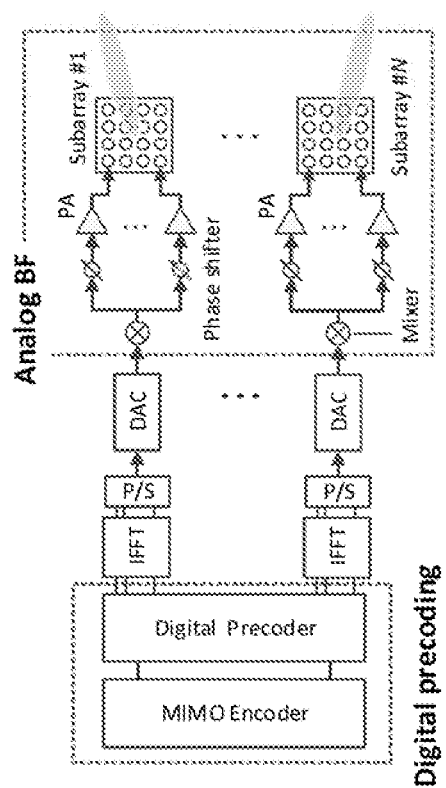
FIG. 3 illustrates a diagram for hybrid beamforming.
Figure 4A:
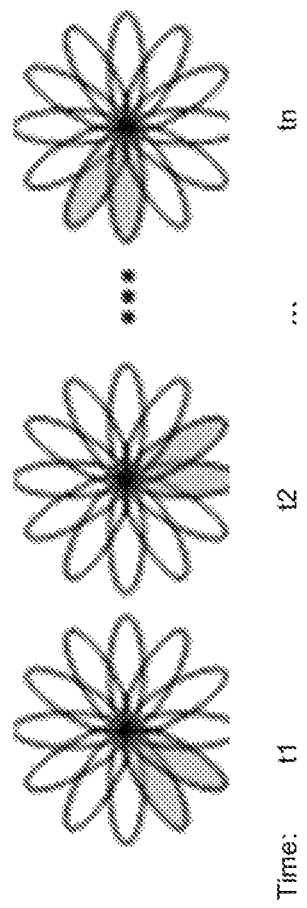
FIG. 4a is a schematic illustration of a Tx beam sweeping on 2 subarrays.
Figure 4B:
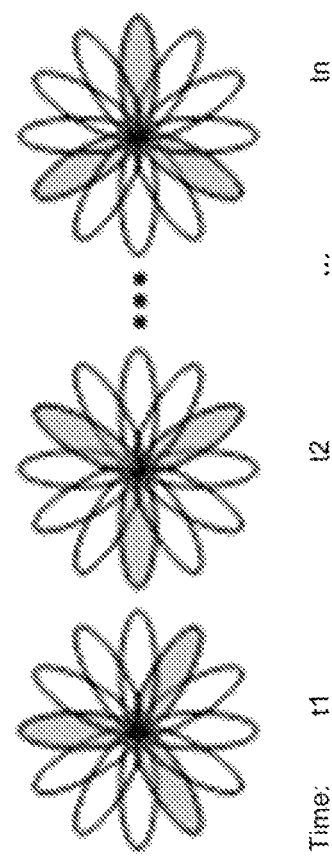
FIG. 4b is a schematic illustration of a Tx beam sweeping on 3 subarrays.
Figure 5:
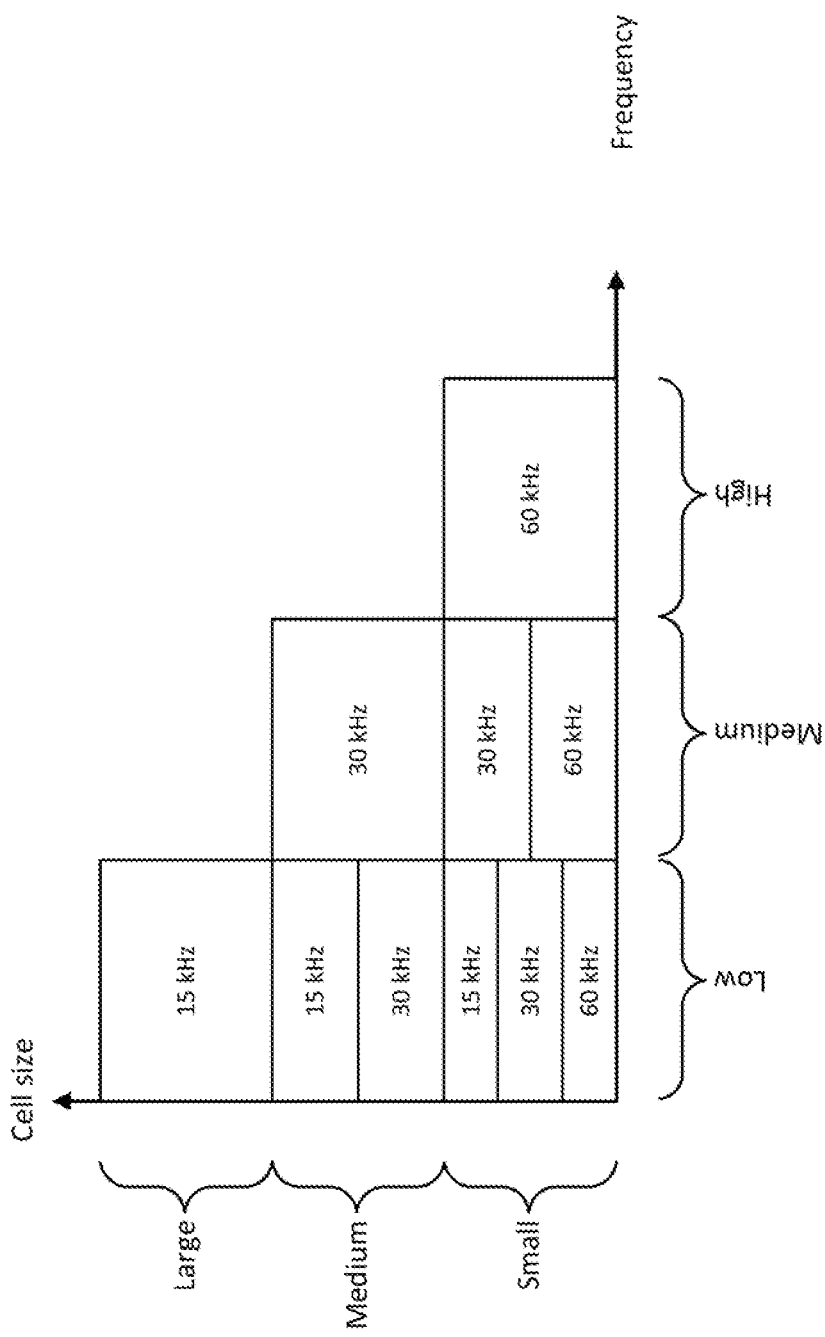
FIG. 5 is an example of subcarrier spacing candidate configuration for NR.
Figure 6:
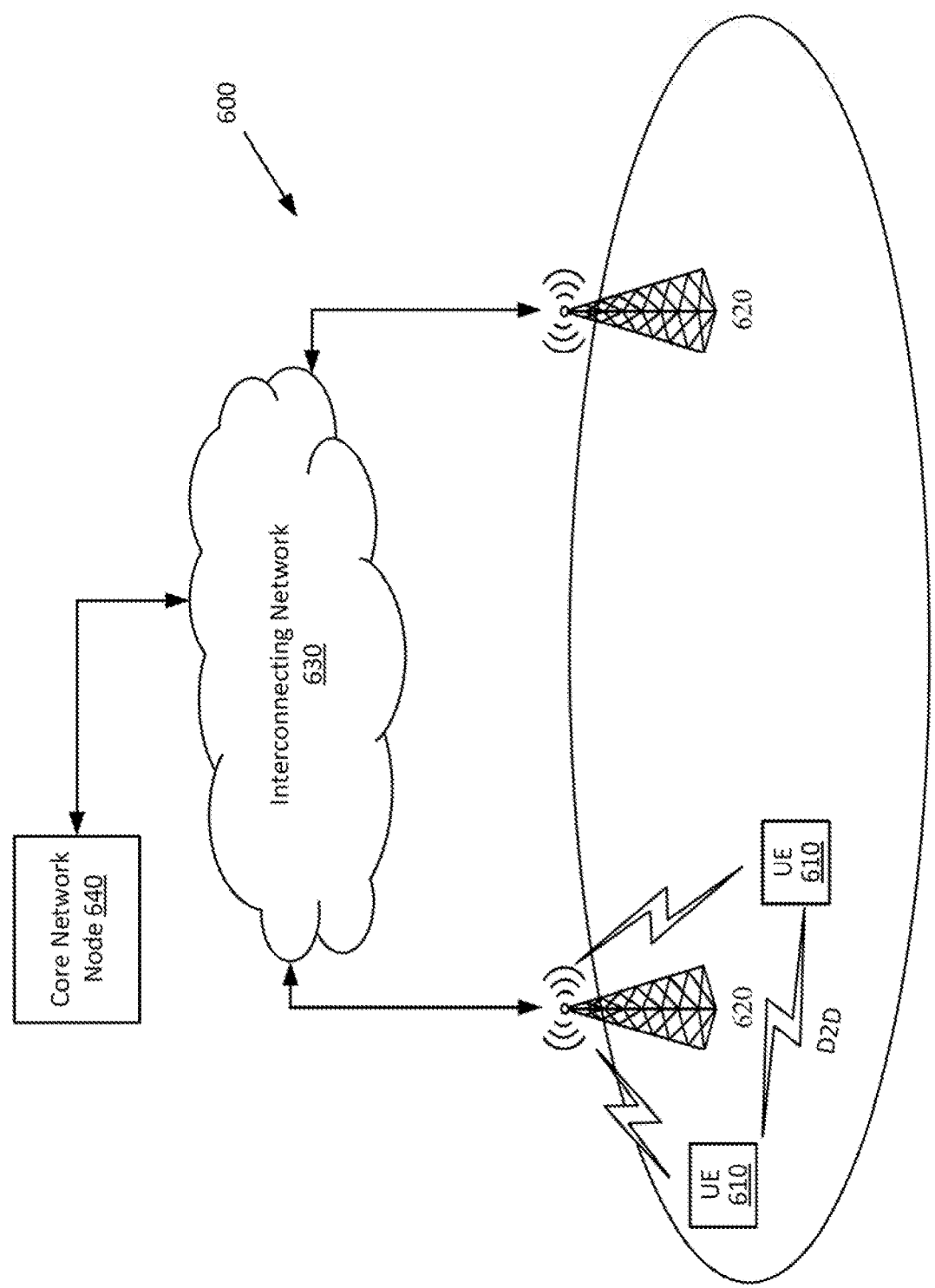
FIG. 6 is a schematic illustration of a wireless network.

FIG. 6 illustrates an example of a wireless network 600 that may be used for wireless communications. Wireless network 600 includes wireless devices 610 (e.g., user equipment, UEs) and a plurality of radio access nodes 620 (e.g., eNBs, gNBs, etc.) connected to one or more core network nodes 640 via an interconnecting network 630. The network 600 may use any suitable deployment scenarios, such as the non-centralized, co-sited, centralized, or shared deployment scenarios illustrated in FIGS. 2a-2d. Wireless devices 610 within a coverage area may each be capable of communicating directly with radio access nodes 620 over a wireless interface. In certain embodiments, wireless devices 610 may also be capable of communicating with each other via device-to-device (D2D) communication. In certain embodiments, radio access nodes 620 may also be capable of communicating with each other, e.g. via an interface (e.g. X2 in LTE or other suitable interface).

As an example, wireless device 610 may communicate with radio access node 620 over a wireless interface. That is, wireless device 610 may transmit wireless signals and/or receive wireless signals from radio access node 620. The wireless signals may contain voice traffic, data traffic, control signals, and/or any other suitable information. In some embodiments, an area of wireless signal coverage associated with a radio access node 620 may be referred to as a cell.

In some embodiments, wireless device 610 may be interchangeably referred to by the non-limiting term user equipment (UE). Wireless device 610 can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of a wireless device 610 are described in more detail below with respect to FIG. 9.

In certain embodiments, radio access nodes 620 may interface with a radio network controller. The radio network controller may control radio access nodes 620 and may provide certain radio resource management functions, mobility management functions, and/or other suitable functions. In certain embodiments, the functions of the radio network controller may be included in radio access node 620. The radio network controller may interface with a core network node 640. In certain embodiments, the radio network controller may interface with the core network node 640 via an interconnecting network 530.

The interconnecting network 630 may refer to any interconnecting system capable of transmitting audio, video, signals, data, messages, or any combination of the preceding. The interconnecting network 630 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 640 may manage the establishment of communication sessions and various other functionalities for wireless devices 610. Examples of core network node 640 may include MSC, MME, SGW, PGW, O&M, OSS, SON, positioning node (e.g. E-SMLC), MDT node, etc. Wireless devices 610 may exchange certain signals with the core network node using the non-access stratum layer. In non-access stratum signaling, signals between wireless devices 510 and the core network node 640 may be transparently passed through the radio access network. In certain embodiments, radio access nodes 620 may interface with one or more network nodes over an internode interface. For example, radio access nodes 620 may interface over an X2 interface with each other.

Although FIG. 6 illustrates a particular arrangement of network 600, the present disclosure contemplates that the various embodiments described herein may be applied to a variety of networks having any suitable configuration. For example, network 600 may include any suitable number of wireless devices 610 and radio access nodes 620, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments are applicable to any RAT, such as UTRA, E-UTRA, narrow band internet of things (NB-IoT), WiFi, Bluetooth, next generation RAT (NR, NX), 4G, 5G, LTE FDD/TDD, WCDMA/HSPA, GSM/GERAN, WLAN, CDMA2000, etc.

In some embodiments, generic terminology "network node" is used. A "network node" refers to equipment capable, configured, arranged and/or operable to communicate directly or indirectly with a wireless device and/or with other equipment in the wireless communication network that enable and/or provide wireless access to the wireless device. As such, it can be any kind of network node which may comprise a radio network node such as radio access node 620 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

The term radio access technology (RAT) may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" may be used to denote a UE (e.g., wireless device 610) or a radio network node (e.g., radio access node 620). A radio node may also be in some cases interchangeably called a transmission point (TP) or transmission reception point (TRP).

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "signaling" used herein may comprise any of: high-layer signaling (e.g., via RRC or the like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources are: symbol, time slot, subframe, radio frame, TTI, interleaving time, etc.

The term "radio measurement" used herein may refer to any measurement performed on radio signals. Radio measurements can be absolute or relative. Radio measurements can be, for example, intra-frequency, inter-frequency, CA, etc. Radio measurements can be unidirectional (e.g., downlink, DL, or uplink, UL) or bidirectional (e.g., round trip time, RTT, receive-transmit, Rx-Tx, etc.). Some examples of radio measurements: timing measurements (e.g., time of arrival, TOA, timing advance, round trip time, RTT, reference signal time difference, RSTD, SSTD, receive-transmit, Rx-Tx, propagation delay, etc.), angle measurements (e.g., angle of arrival), power-based measurements (e.g., received signal power, reference signal received power, RSRP, received signal quality, reference signal received quality, RSRQ, signal-to-interference-plus-noise ratio, SINR, signal-to-noise ratio, SNR, CSI, CQI, PMI, interference power, total interference plus noise, received signal strength indicator, RSSI, noise power, etc.) cell identification or detection, beam identification or detection, RLM, System Information (SI) reading (e.g. acquisition of MIB and/or one or more SIBs, etc.), acquisition of cell global ID (CGI), CSI measurements, etc. The measurement may be performed on one or more links in each direction, e.g. RSTD or relative RSRP or based on signals from different TPs of the same (shared cell).

The term "beamformed measurement" as known as "radio beamformed measurement" used herein refers to any of the above radio measurements performed by a radio node on at least radio signals, which are transmitted by another radio node using at least one beam. The transmitted beam may be created by at least 2 transmit antennas or antenna elements. The beamformed measurement is also interchangeably called as a 'measurement with beamforming', a measurement on one or more beams, a beam measurement etc. The term beamformed measurement may further comprise performing the measurement using beamformed reception, i.e., using at least one reception beam. The beamformed measurement performed without measurement on the reception beam is denoted by Nb1. The beamformed measurement performed with reception beam is denoted by Nb2. For consistency beamformed measurement is denoted by a generic term, 'Nb' and it can be Nb1 or Nb2.

The term "non-beamformed measurement" aka "radio non-beamformed measurement" used herein refers to any of the above radio measurements performed by a radio node on at least radio signals, which are transmitted by another radio node without any beam. The radio signal may be transmitted from the other radio node by using one or more transmit antennas. The radio signals are transmitted in the entire cell or at least in the part of the signal e.g. in the sector. The non-beamformed measurement is also interchangeably called as a 'measurement without beamforming', a measurement on omnidirectional signals or signals transmitted from omnidirectional or sectorized but not beamforming antennas, an omnidirectional measurement, sector measurement etc. The term non-beamformed measurement may further comprise performing the measurement using non-beamformed reception, i.e., without using any reception beam. The non-beamformed measurement performed without reception beam is denoted by Nn1. The term non-beamformed measurement may further comprise performing the measurement using beamformed reception, i.e., with using at least one reception beam. The non-beamformed measurement performed with reception beam is denoted by Nn2. For consistency, non-beamformed measurement with or without reception beam is denoted by a generic notation, 'Nn' and it can be Nn1 or Nn2.

The term "measurement performance" used herein may refer to any criteria or metric which characterizes the performance of the measurement performed by a radio node. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with regards to a reference value (e.g. ideal measurement result) etc. Examples of measurement time are measurement period, cell identification period, evaluation period, etc.

The term dynamic (e.g., in time) antenna configuration may comprise:
  The dynamic antenna configuration relates to beamforming and may comprise beam switching or beam sweeping in time domain (which may use interchangeably herein in some embodiments).
  The dynamic antenna configuration may be at the first radio node side or at the second and/or third radio nodes sides.
  The dynamic configuration may apply to receive antennas and/or transmit antennas. The term "numerology" used herein may refer, e.g., to any one or more of: subcarrier spacing, number of subcarriers per RB, CP length, number of RBs within the bandwidth, subframe length, etc. The numerology may be configured statically or change dynamically for transmissions from the same TP or cell and may or may not be the same for different cells and/or carrier frequencies.

Combined Capability of Measurements Based on Different Numerologies

A combined capability of a radio node comprises a capability of performing a first amount M1 of measurements based on a first numerology NUM1 and a second amount M2 of measurements based on a second numerology NUM2. The capability may further comprise, e.g., a function or a relation between the first and the second amounts.

In one example, the number and/or a set of numerologies supported for receptions (e.g., measurements) and/or transmissions may be restricted. For example, a UE may not support M1 with NUM1 and M2 with NUM2 in parallel if NUM1 and NUM2 are too different or belong to different groups, e.g., NUM1 is 15 kHz and NUM2 is above 400 kHz. In one example, the capability may comprise measurement reporting criteria. In another example, the capability may comprise a minimum measurement capability or requirement.

A first numerology NUM1 and/or a second numerology NUM2 may further comprise one numerology or a group of similar numerologies (e.g., with subcarrier spacing below a first threshold and/or above a second threshold). M1 and/or M2 may further depend on the measurement bandwidth (e.g., BW1 and BW2, respectively). M1 and/or M2 may further depend on whether NUM1 and NUM2 are configured statically or dynamically.

M1 and/or M2 may further depend on whether NUM1 and NUM2 are known to the UE or have to be blindly or semi-blindly determined by the UE. M1 and/or M2 may further depend on whether the corresponding measurements are beam-formed or non-beamformed. M1 and M2 may further depend on carrier frequency or frequency band, e.g., the UE may support M1_1 measurements based on NUM1 and M2_1 based on NUM2 on a first frequency f1 (e.g., below 6 GHz) and M1_2 measurements based on NUM1 and M2_2 based on NUM2 on a second frequency f2 (e.g., 40 GHz). M1 and/or M2 may further depend on the relation between NUM1 and NUM2. For example, the values of M1 and/or M2 are smaller if NUM1 and NUM2 differ by more than a margin (Mg) compared to the case when NUM1 and NUM2 do not differ by more than Mg. More specifically as an example if NUM1 and NUM2 correspond to subcarrier spacing of 15 KHz and 30 KHz, then M1 and M2 can be 12 and 12 respectively. But if NUM1 and NUM2 correspond to subcarrier spacing of 15 KHz and 60 KHz, then M1 and M2 can be 8 and 8 respectively.

M1 and/or M2 may further depend on the relation of the frequencies configured with NUM1 and NUM2. For example, the relation can be associated with their absolute frequencies. In another example the relation can be associated with the guard band between the frequencies configured with NUM1 and NUM2. For example, if the guard band between the frequencies F1 and F2 configured with NUM1 and NUM2 respectively is larger than a certain margin (Bg) then M1 and M2 are larger than a certain threshold (Mh). But if the guard band between F1 and F2 configured with NUM1 and NUM2 respectively is not larger than Bg then M1 and M2 are not larger than Mh. M1 and/or M2 may further depend on whether the radio node is configured to also perform one or more measurements on one or more other RATs (e.g. LTE, UMTS, GSM, etc). For example, the values of M1 and/or M2 may be smaller if the radio node is configured to also perform one or more measurements on one or more other RATs compared to the case when the UE is configured to measure only on carriers associated with NUM1 and NUM2. M1 and/or M2 may further depend on the configured values of NUM1 and NUM2. This is explained with few examples. In one example, M1 and M2 depend on at least the numerologies of the respective carriers on which the measurement is done as expressed by the following expression:

M1=h(NUM1) and M2=h1(NUM2).

In another example, M1 and M2 depend on at least both numerologies (NUM1 and NUM2) as expressed by the following expression:

M1=h2 (NUM1, NUM2) and M2=h3 (NUM2, NUM1).

M1 and/or M2 may further depend on whether the corresponding measurements are performed on different carriers or on the same carrier or cell in different time resources. This is explained with examples below.

In one example the radio node may be capable of performing:
  M1 amount of measurements on a first carrier (F1) configured with NUM1 and
  M2 amount of measurements on a second carrier (F2) configured with NUM2.

In another example the radio node may be capable of performing:
  M1 amount of measurements during a first set of time resources (R1) on a third carrier (F3) configured with NUM1 during R1; and
  M2 amount of measurements during a second set of time resources (R2) on F3 configured with NUM2 during R2.

M1 and/or M2 may further depend on whether the corresponding measurements are performed on one or more serving carrier frequencies of the radio node and/or on one or more non-serving carrier frequencies of the radio node. This is explained with examples below.

In one example the radio node may be capable of performing:
  M11 amount of measurements on one serving carrier frequency configured with NUM1, and
  M12 amount of measurements on one non-serving carrier frequency configured with NUM1, where M11+M12≤M1.

In another example the radio node may be capable of performing:
  M21 amount of measurements on one serving carrier frequency configured with NUM2, and
  M22 amount of measurements on one non-serving carrier frequency configured with NUM2, where M21+M22≤M2.

For example, the UE may be capable of performing M1 measurements based on subcarrier spacing SC1 or M2 measurements based on subcarrier spacing SC2, e.g.:
  for the same measurement bandwidth BW1=BW2, M1>M2 if SC1>SC2 or if SC1-SC2>threshold, or
  M1=M2 if BW1>BW2 and SC1>SC2.

The first amount M1 of measurements and the second amount M2 of measurements or the measurements within each of the first and second amounts of measurements may be parallel measurements or the measurements performed and/or maintained and/or reported in parallel. The term "parallel" may mean over the same certain time period or in the same or overlapping time resources. In the latter, a UE may use measurement gaps to ensure that M1 measurements and M2 measurements are not performed in the same or overlapping time resources, unless the UE is capable to perform them in the same or overlapping in time resources.

The first amount M1 of measurements and the second amount M2 of measurements or the measurements within each of the first and second amounts of measurements may be performed within a certain measurement time (T0) or during partially or fully overlapping time periods, T1 and T2. For example, T1 can be measurement time over which one or more NUM1-based measurements may be performed, whereas T2 can be measurement time over which one or more NUM2-based measurements may be performed. Examples of measurement time are physical layer measurement period, evaluation period, cell identification time or duration, system information acquisition time, radio measurement time period, etc. As an example, parameter T0 can be defined by a general expression: T0=g(T1, T2). An example of a specific function defining T0 can be: T0=T1+T2.

Another example of a specific function defining T0 can be: T0=MAX (T1, T2).

The combined capability may be, e.g.:
  specific to a certain one type of measurements, e.g., intra-frequency cell/beam detection or cell/beam identification measurements, or
  specific to a certain set of measurement types, e.g., intra-frequency cell/beam detection or cell/beam identification measurements, or
  specific to a certain purpose of measurements, e.g., any positioning measurements,
  may be for any measurement types performed in parallel for a given RAT such as 5G (e.g., any intra- and inter-frequency measurements).

The term parallel measurements herein may mean for example M1 measurements and M2 measurements performed by the first radio node within a certain time period, T0 or during at least partially overlapping measurement times, T1 and T2. The radio node may obtain measurement samples of different measurements at the same or different times.

In one general example, the function may be represented, e.g., as:
  f1(N1, N1_min, N1_max, N1c, N1c_min, N1c_max, N1pc, N1pc_min, N1pc_max, C1b, C1_min, C1_max, N2, N2_min, N2_max, N2c, N2c_min, N2c_max, N2pc, N2pc_min, N2pc_max, C2b, C2_min, C2_max, N_NUM1, N_NUM2) or
  f1(N1, N1_min, N1_max, N1c, N1c_min, N1c_max, N1pc, N1pc_min, N1pc_max, C1b, C1_min, C1_max, N2, N2_min, N2_max, N2c, N2c_min, N2c_max, N2pc, N2pc_min, N2pc_max, C2b, C2_min, C2_max, N_NUM1, N_NUM2)=f2 or
  f1(N1, N1_min, N1_max, N1c, N1c_min, N1c_max, N1pc, N1pc_min, N1pc_max, C1b, C1_min, C1_max, N2, N2_min, N2_max, N2c, N2c_min, N2c_max, N2pc, N2pc_min, N2pc_max, C2b, C2_min, C2_max, N_NUM1, N_NUM2)<=f3,
where at least two parameters in f1( . . . ) have to be present, one related to the first amount and beamformed measurements and one related to the second amount and non-beamformed measurements, and where:
  the amount MX (X=1 or 2) corresponding to the numerology NUMX (X=1 or 2) may comprise, e.g., at least one of:
    NX or at least NX_min or at most NX_max measurements based on NUMX
      In one example, the measurements are to be performed on the same carrier frequency, or
      In another example, the measurements are to be performed over two or more different carrier frequencies.
    NXc or at least NXc_min or at most NXc_max cells in which measurements based on NUMX are performed, which may be, e.g.:
      In one example, the measurements are to be performed on the same carrier frequency, or
      In another example, the measurements are to be performed over two or more different carrier frequencies.
    NXpc or at least NXpc_min or at most NXpc_max measurements per cell.
    CX or at least CX_min or at most CX_max measurements per cell.
  A maximum measurement capacity, e.g., f2 or f3, where f2 and f3 may be pre-defined or determined based on a pre-defined rule and/or condition or may be even configured or controlled by another node.
  N_NUM1 and N_NUM2 are the number of numerologies supported by the UE in parallel for receptions (e.g., measurements or channel reading) and/or transmissions.

The capability function may also be represented by:
  a set of {N_NUM1, N_NUM2} or f4(N_NUM1, N_NUM2) or
  f4(N_NUM1, N_NUM2)=F5 or f4(N_NUM1, N_NUM2)<=F6.

In another general example, the capability may comprise a set of combinations based on a compromise or a trade-off between the NUM1-based and NUM2-based measurements.

In one example, the set may comprise, e.g., (N1_1,N2_1) and (N1_2,N2_2), where N1_1>N1_2 and N2_1<N2_2.

In another example, the set may be determined by a rule, e.g., based on the relation K1 measurements based on NUM1 may count as K2 measurements based on NUM2, i.e., K1:K2. The relation may depend, e.g., on numerology relation e.g., q(NUM1):q(NUM2), e.g.: SC1=15*2^0 kHz and SC2=15*2^2=60 kHz so N1:N2 may be (⅕):(1/60) or (½^0):(½^2) or 2:1 (based on the powers of 2).

For example, based on a relation 1:2, the set may be e.g.:
  4 measurements in M1 (based on NUM1) and 0 measurements in M2 (based on NUM2);
  2 measurements in M1 (based on NUM1) and 4 measurements in M2 (based on NUM2);
  0 measurements in M1 (based on NUM1) and 8 measurements in M2 (based on NUM2).

First Aspect: Methods in a First Radio Node

Figure 7:
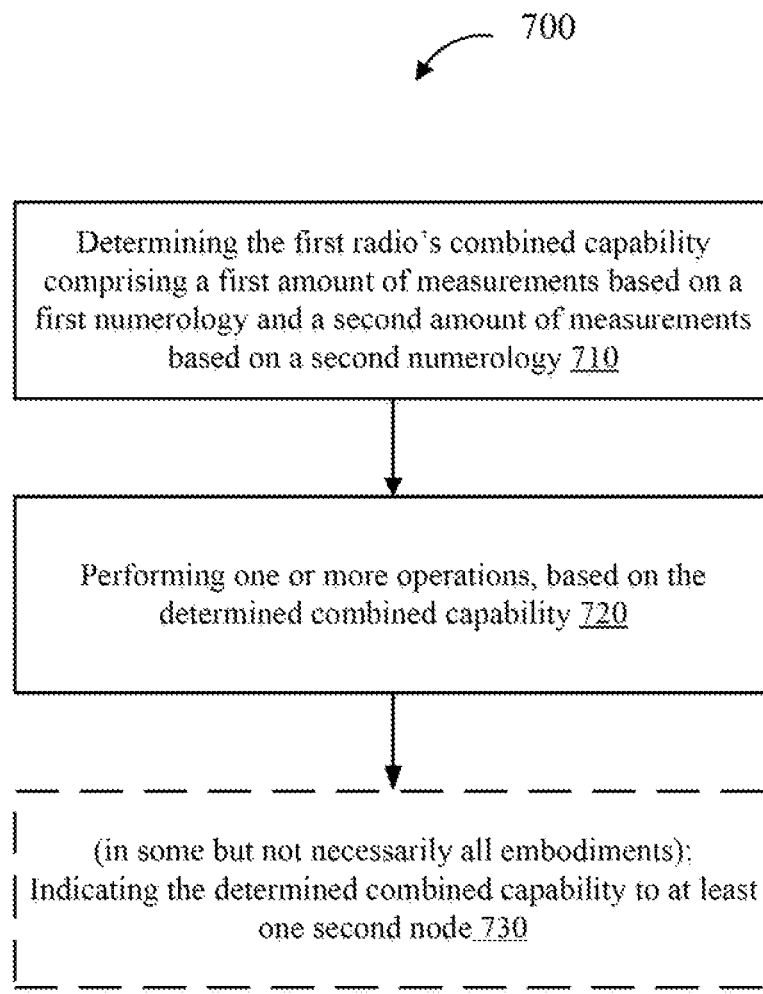
FIG. 7 is a flowchart of a method in a first radio node, according to an embodiment.

FIG. 7 illustrates some embodiments of methods in a first radio node, in accordance with a first aspect of the present disclosure.

Some Embodiments of the Method 700 According to this Aspect Comprise the Following Steps:

Step 710: Determining the first radio node's combined capability comprising a first amount (M1) of measurements based on a first numerology (NUM1) and a second amount (M2) of measurements based on a second numerology (NUM2).

Step 720: Performing one or more operations, based on the determined combined capability.

Step 730: (in some but not necessarily all embodiments): Indicating the determined combined capability to at least one second node.

Examples of the first radio node include: UE, a radio network node. Some examples of the second node include: another UE, another radio network node, a core network, a radio network controller, positioning node, etc.

Step 710

The first amount can be referred to as M1, the second amount can be referred to as M2, the first numerology can be referred to as NUM1 and the second numerology can be referred to as NUM2. In one example, M1 and M2 may further depend on whether the measurements are beamformed or non-beamformed.

The combined capability may be determined, e.g., based on one or more of:
  A pre-defined value or a set of values (e.g., for different measurement types);
  A pre-defined rule;
  One or more conditions;
  A message from another node;
  A minimum requirement or condition on one of the beamformed and non-beamformed measurements (e.g., the first radio node may support all five combinations {4 beamformed and 0 non-beamformed, 3 beamformed and 2 non-beamformed, 2 beamformed and 4 non-beamformed, 1 beamformed and 6 non-beamformed, 0 beamformed and 8 non-beamformed} but with a minimum requirement or condition on at least 4 non-beamformed measurements leaves us only with the three last combinations).

Step 720

In this step, the first radio node may perform one or more operations, based on the determined capability. In one example, performing may comprise performing adaptively to the capability.

Example Operations Include:
  Radio measurements comprising at least one of: measurements based on numerology NUM1 and measurements based on numerology NUM2;
  any UE operation or activity involving at least receiving one or more radio signals and/or channels;
  link adaptation;
  a mobility-related operation;
  cell change or (re)selection;
  beam change or (re)selection;
  an RRM-related operation;
  positioning-related operation (e.g., positioning measurements, positioning message exchange or reporting, location calculation);
  measurement collection and storing/logging;
  MDT operation;
  Reporting results of the operation (e.g. measurement results) to another node;
  a timing related procedure;
  a timing adjustment related procedure;
  UE location tracking procedure;
  time tracking related procedure; and
  synchronization related procedure.

The radio measurement may be DL, UL, on peer-to-peer link(s), or bidirectional. The measurement may be performed on one or more links in each direction. The radio node may first determine the need to perform radio measurement based on receiving a measurement configuration or may be triggered by an event or condition. For example, the radio node may receive a request for evaluating one or more measurement events involving Nb and Nn measurements. The measurement configuration may be received from another node such as the network node e.g. serving cell. The configuration information may be received via higher layer signals (e.g. RRC message) or via lower layer signaling (e.g. MAC command etc.). The triggering may be based on for example an autonomous action in the radio node e.g. when certain timer or counter expires, when the current measurement value falls below a certain threshold etc. The performing of an operation may be adapted to the determined capability. The performing of an operation may further be adapted to the already configured or on-going measurements, e.g., to use the remaining capability for the new measurements.

For example, the UE may adapt sampling rate, measurement bandwidth and/or Fast Fourier Transform (FFT) size, to not exceed the total capability, depending on the capability and/or the available capability (e.g., depending on the on-going measurements).

The adapting may further comprise, e.g., one or more of:
  dropping/delaying/postponing/pausing/suspending/resuming a new operation;
  Stopping/dropping/delaying/pausing/suspending/resuming an on-going operation;
  Performing a new operation or completing an on-going operation while allowing for a more relaxed performance, if achieving a better performance may go beyond the capability;
  If there are on-going measurements based on NUM1, the UE may prioritize new measurements which are based on the same numerology;
  If the UE supports measurements on no more than L numerologies (L=1, 2, . . . ) in parallel, the UE has on-going measurements for K numerologies (K<=L), then the UE may selectively configure/start new measurements in parallel so that all measurements are not performed based on more than L numerologies in parallel, i.e., the UE can accept no more than L-K other numerologies.
  Depending on the set of supported numerologies, the UE may require different sizes of guard band (in frequency) and/or guard period (in time), which may be pre-defined or selected from a set of supported guard bands/periods adaptively to the used numerologies.

Step 730

In this step, the first radio node may indicate the determined capability to at least one second node. The indication may be via unicast, multicast or broadcast.

The indication may be upon a request, e.g., from the second node or another node, or in an unsolicited way. The indication may also be sent upon a triggering event (e.g., cell or beam change or upon being configured with a certain service) or condition.

Second Aspect: Methods in a Second Node

Figure 8:
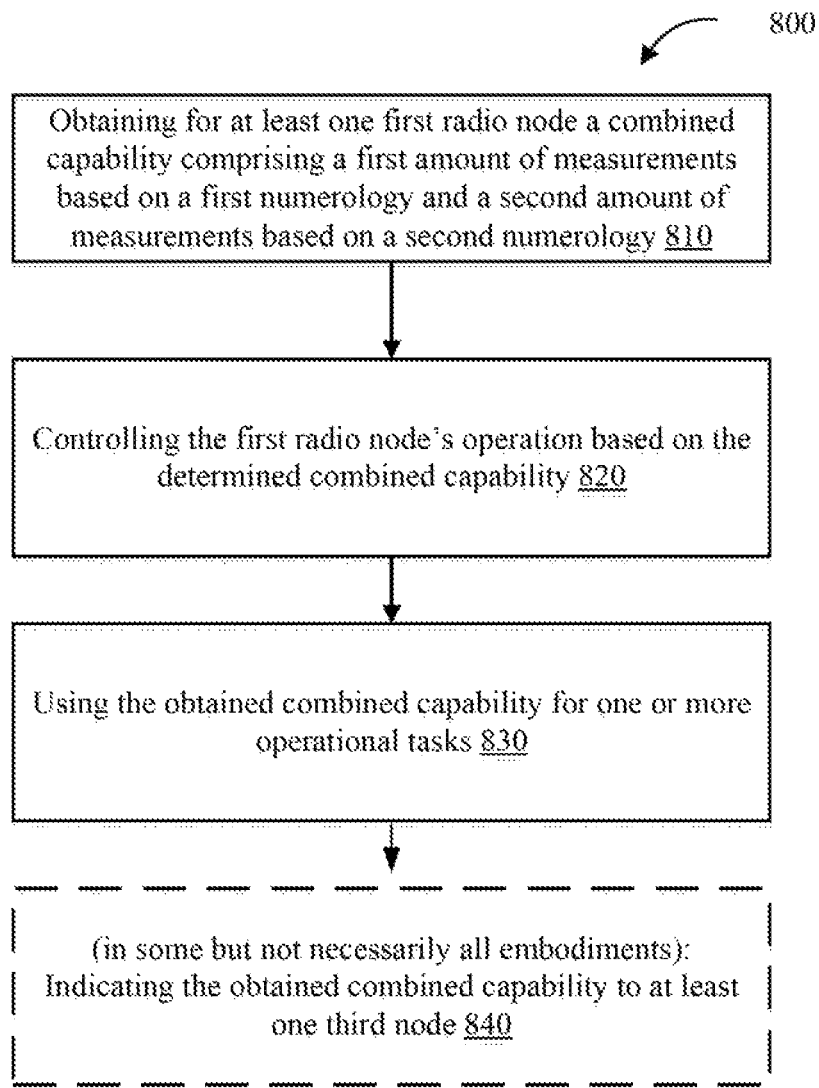
FIG. 8 is a flowchart of a method in a second radio node, according to an embodiment.

FIG. 8 illustrates embodiments of methods in a second radio node, in accordance with a second aspect of the present disclosure. Embodiments of methods in a first radio node are applicable.

Some embodiments of the method 800 according to this aspect comprise the following steps:

Step 810: Obtaining for at least one first radio node a combined capability comprising a first amount of measurements based on a first numerology and a second amount of measurements based on a second numerology.

Step 820: Controlling the first radio node's operation based on the determined combined capability.

Step 830: Using the obtained combined capability for one or more operational tasks.

Step 840 (in some but not necessarily all embodiments): indicating the obtained combined capability to at least one third node.

Some examples of the second radio node include: UE, radio network node, a core network, a radio network controller, positioning node, etc.

Some examples of the first radio node include: another UE or another radio network node. Some examples of the third radio node include: another UE, another radio network node, a core network, a radio network controller, positioning node, etc.

Step 810

The first amount can be referred to as M1, the second amount can be referred to as M2, the first numerology can be referred to as NUM1 and the second numerology can be referred to as NUM2. In one example, M1 and M2 may further depend on whether the measurements are beamformed or non-beamformed.

The obtaining may be based, e.g., on one or more of:
Pre-defined rule e.g. functions or expressions,
Message or indication received from another node (e.g., from the first radio node or its serving BS or its neighbor forwarding the first radio node's capability),
Historical data and/or statistics,
Measurement reports from the first radio node (e.g., based on the assumption that the reported measurements cannot exceed the capability and thus set a lower bound on the capability),
Based on the type of the first radio node (e.g., based on the assumption that all first radio nodes of a certain type have the same pre-defined capability),
Associating with another radio node (e.g., based on the assumption that radio nodes of the same time have the same capability),
Derived from one or more other capabilities (e.g., based on the assumptions that first radio nodes supporting a certain one or more features have a certain combined capability).

Step 820

In this step, the second radio node may control the first radio node's operation, based on the determined combined capability.

For example, the controlling may comprise sending a control message or indication to at least the first radio node (e.g., via unicast, multicast, or broadcast; via higher-layer signaling and/or lower-layer signaling).

In one example, controlling may further comprise, e.g., one or more of:
Configuring measurement bandwidth;
Configuring measurements for the first radio node;
Configuring measurement reporting for the first radio node;
Providing assistance data (e.g., adapt the content of the assistance information or determine whether the assistance information is to be provided or not);
Configuring measurement time;
Configuring measurement performance target (e.g., target accuracy or target quality);
Configuring sampling rate in frequency and/or time;
Configuring number of samples in frequency and/or time;
Configuring FFT size;
Configuring the size of each measurement sample in frequency and/or time e.g. size of snapshot; and
Configuring new carrier bands.

Step 830

In this step, the second radio node may use the obtained combined capability for one or more operational tasks. Some examples of the operational tasks include:

Adapting measurement configuration for the first radio node, based on its capability (e.g., the amount of measurements, measurement reporting configuration, measurement sampling rate, measurement period, measurement bandwidth e.g. a larger BW may be needed for a larger carrier spacing, etc.), Adapting the number of numerologies configured for the UE to receive and/or transmit, e.g.,
If the UE supports measurements on no more than L numerologies (L=1, 2, . . . ) in parallel, the UE has on-going (e.g., already configured by the second radio node) measurements for K numerologies (K<=L), then the second radio node configures adaptively new measurements so that all measurements configured in the UE are not performed based on more than L numerologies in parallel;

Adapting the set of carrier frequencies and frequency bands if they also impact the measurement capabilities, e.g., carrier frequencies from bands close in frequency may be preferred;

Adapting at least one signal/channel transmission configuration (e.g., numerology, transmission bandwidth, location in frequency, number of repetitions in frequency and/or time, periodicity in time, etc.) to be received by the first radio node, based on its capability;

Adapting antenna configuration (e.g., beam configuration, power, etc.), based on the capability of one or more first radio nodes (e.g., the adaptation may be different e.g. when no UEs can support more than two NUM2-based measurements and when no UEs can support more than 6 NUM2-based measurements);

Adapting scheduling for transmissions by the first radio node and/or other radio nodes;

Adapting scheduling for own transmissions;
Second node's measurements;
Positioning;
MDT;
O&M, SON;
Beam change, cell change or handover;
Adapting radio transmission parameters in one or more second nodes or in nodes on which signals the radio node does measurements. The aim is to facilitate the radio node to perform the NUM1- and NUM2-based measurements while meeting its capability requirements. Examples of radio transmission parameters are transmit power, cell identifier, reference signal configuration, antenna configuration etc.;

Adapting a set of numerologies (e.g., in the UE and/or in the second node) for operating (e.g., in DL and/or UL) on one or more carriers;

Adapting guard band (e.g., in the UE and/or in the network node) between carriers operating with different numerologies;

Adapting guard periods (e.g., in the UE and/or in the network node) between different transmissions and/or receptions.

Step 840

In this step, the second node may indicate the obtained capability to at least one third node. The indication may be via unicast, multicast, broadcast, via radio interface or another interface (e.g., via X2 or a like).

The indication may be upon a request from another node. The indication may also be sent upon a triggering event (e.g., cell or beam change or upon being configured with a certain service) or condition.

Now turning to FIG. 13, a method 1300 for performing measurements in a communication network, such as 600, will be described. The method 1300 can be performed in a first radio node. The first radio node can be a wireless device/UE 610 or a radio network node 620.

Method 1300 starts with performing a first amount of measurements on a first signal based on a first numerology (block 1310). Method 1300 continues with performing a second amount of measurements on a second signal based on a second numerology (block 1320), wherein performing the first amount of measurements and the second amount of measurements is based on a relation between the first and second amount of measurements.

In some embodiments, method 1300 comprises performing radio measurements, based on the relation between the first and second amounts of measurements. For example, the first amount of measurements and the second amount of measurements can depend on whether the measurements are beamformed or non-beamformed. Also, the first amount of measurements and the second amount of measurements can be performed in parallel or alternatively, they can be performed in separate time resources.

In some embodiments, the first amount of measurements and the second amount of measurements can be performed over a measurement time T0 which is a function of a first measurement time T1 over which one or more measurements based on the first numerology are performed and a second measurement time T2 over which one or more measurements based on the second numerology are performed. For example, the function can be a summation of T1 and T2, i.e. T0=T1+T2. The function can also be a maximum value between T1 and T2, i.e. T0=MAX (T1, T2).

In some embodiments, method 1300 comprises determining a combined capability of the first radio node. Method 1300 may further comprise sending an indication of the determined capability to at least one second node. The second node can be another UE, another radio network node, a core network node, etc.

In some embodiments, the relation is different dependent on whether the first amount and the second amount of measurements are performed in non-overlapping time resources or in the same time resources. In some embodiments, at least one of the first numerology and the second numerology comprises one numerology or a group of similar numerologies.

In some embodiments, the first signal is a first carrier configured with the first numerology and the second signal is a second carrier configured with the second numerology. In some embodiments, the first numerology and the second numerology are any one or more of: subcarrier spacing, number of subcarriers per resource block, cyclic prefix length, number of resource blocks within the bandwidth, subframe duration, TTI duration, slot duration and number of symbols within a certain time unit. In some embodiments. In some embodiments, determining the relation between the first and the second amounts of measurements comprises determining a relation between the first numerology and the second numerology. For example, the relation can be a difference between the first and second numerologies. For example, the relation can depend on frequencies configured with the first and second numerologies.

Now turning to FIG. 14, a method 1400 for controlling measurements in a communication network will be described. The method can be performed in a second radio node, such as a radio network node, a UE, a core network node, a radio network controller, a positioning node, etc.

Method 1400 starts with obtaining for a first radio node a combined capability for performing a first amount of measurements on a first signal based on a first numerology and a second amount of measurements on a second signal based on a second numerology, the combined capability comprising a relation between the first and the second amounts (block 1410). Method 1400 continues with adapting the first radio node's measurements, based on the obtained combined capability (block 1420).

In some embodiments, method 1400 further comprises sending a message to the first radio node, the message comprising the combined capability for configuring the measurements based on the combined capability.

Figure 9:
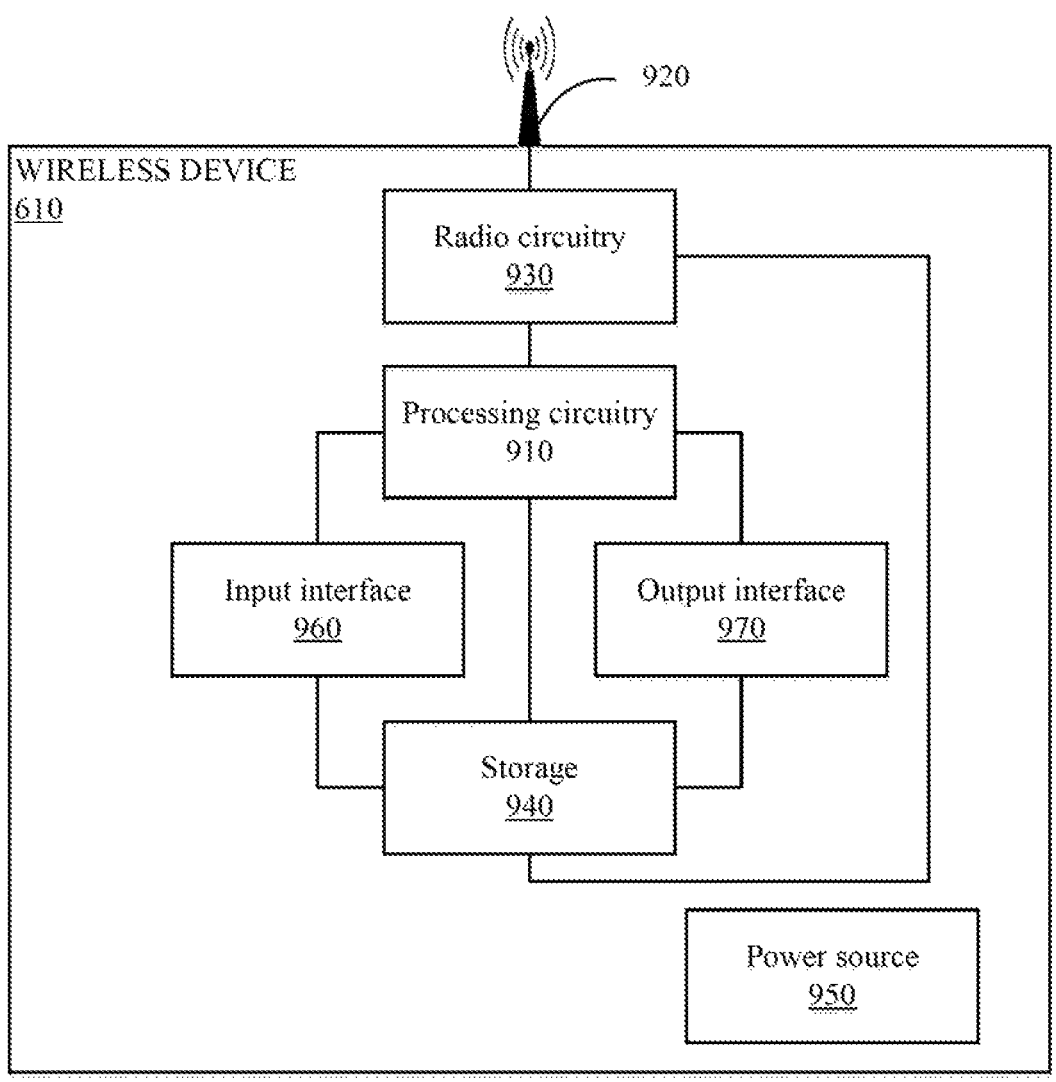
FIG. 9 is a schematic illustration of a wireless device, according to an embodiment.

FIG. 9 is a block diagram of an exemplary wireless device 610, in accordance with certain embodiments. The wireless device 610 may be a user equipment. Wireless device 610 includes processing circuitry 910, an antenna 920, radio front-end circuitry 930, and a computer-readable storage medium 940. Antenna 920 may include one or more antennas or antenna arrays, and is configured to send and/or receive wireless signals, and is connected to radio front-end circuitry 930. In certain alternative embodiments, wireless device 610 may not include antenna 920, and antenna 920 may instead be separate from wireless device 610 and be connectable to wireless device 610 through an interface or port.

The radio front-end circuitry 930 may comprise various filters and amplifiers, is connected to antenna 920 and processing circuitry 910, and is configured to condition signals communicated between antenna 920 and processing circuitry 910. In certain alternative embodiments, wireless device 610 may not include radio front-end circuitry 930, and processing circuitry 910 may instead be connected to antenna 920 without radio front-end circuitry 930.

Processing circuitry 910 may include any suitable combination of hardware and software implemented in one or more modules to execute instructions and manipulate data to perform some or all of the described functions of wireless device 610 (or first radio node), such as the functions of wireless device 610 described above. Processing circuitry 910 may include one or more of radio frequency (RF) transceiver circuitry, baseband processing circuitry, and application processing circuitry. The transceiver circuitry facilitates transmitting wireless signals to and receiving wireless signals from radio access node 620 (e.g., via an antenna 920). The transceiver circuitry may be connected to input interface 960 and output interface 970. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 910 may include, for example, one or more central processing units (CPUs), one or more processors or microprocessors, one or more application specific integrated circuits (ASICs), and/or one or more field programmable gate arrays (FPGAs). In certain embodiments, the one or more processors may comprise one or more of the modules discussed below with respect to FIG. 11.

In particular embodiments, some or all of the functionality described herein as being provided by a wireless device may be provided by the processing circuitry 910 executing instructions stored on a computer-readable storage medium/memory 940. For example, the processing circuitry 910 performs all the steps and embodiments of methods 700 and 1300. In alternative embodiments, some or all of the functionality may be provided by the processing circuitry 910 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 910 alone or to other components of wireless device 610, but are enjoyed by the wireless device as a whole, and/or by end users and the wireless network generally.

Antenna 920, radio front-end circuitry 930, and/or processing circuitry 910 may be configured to perform any receiving operations described herein as being performed by a wireless device. Any information, data and/or signals may be received from a network node and/or another wireless device.

The processing circuitry 910 may be configured to perform any determining operations described herein as being performed by a wireless device. Determining as performed by processing circuitry 910 may include processing information obtained by the processing circuitry 910 by, for example, converting the obtained information into other information, comparing the obtained information or converted information to information stored in the wireless device, and/or performing one or more operations based on the obtained information or converted information, and as a result of said processing making a determination.

Antenna 920, radio front-end circuitry 930, and/or processing circuitry 910 may be configured to perform any transmitting operations described herein as being performed by a wireless device. Any information, data and/or signals may be transmitted to a network node and/or another wireless device.

Computer-readable storage medium 940 is generally operable to store instructions, such as a computer program, software, an application including one or more of logic, rules, code, tables, etc. and/or other instructions capable of being executed by a processor. Examples of computer-readable storage medium 940 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 910. In some embodiments, processing circuitry 910 and computer-readable storage medium 940 may be considered to be integrated.

Alternative embodiments of wireless device 610 may include additional components beyond those shown in FIG. 9 that may be responsible for providing certain aspects of the wireless device's functionality, including any of the functionality described herein and/or any functionality necessary to support the solution described above. As just one example, wireless device 610 may include input interfaces, devices and circuits, and output interfaces, devices and circuits, and one or more synchronization units or circuits, which may be part of the one or more processors. Input interfaces, devices, and circuits are configured to allow input of information into wireless device 610, and are connected to processing circuitry 910 to allow processing circuitry 910 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 610, and are connected to processing circuitry 910 to allow processing circuitry 910 to output information from wireless device 610. For example, output interfaces, devices, or circuits may include a speaker, a display, vibrating circuitry, a USB port, a headphone interface, or other output elements. Using one or more input and output interfaces, devices, and circuits, wireless device 610 may communicate with end users and/or the wireless network, and allow them to benefit from the functionality described herein.

As another example, wireless device 610 may include power source 950. Power source 850 may comprise power management circuitry. Power source 950 may receive power from a power supply, which may either be comprised in, or be external to, power source 950. For example, wireless device 910 may comprise a power supply in the form of a battery or battery pack which is connected to, or integrated in, power source 950. Other types of power sources, such as photovoltaic devices, may also be used. As a further example, wireless device 610 may be connectable to an external power supply (such as an electricity outlet) via an input circuitry or interface such as an electrical cable, whereby the external power supply supplies power to power source 950. Power source 950 may be connected to radio front-end circuitry 930, processing circuitry 910, and/or computer-readable storage medium 940 and be configured to supply wireless device 610, including processing circuitry 910, with power for performing the functionality described herein.

Wireless device 610 may also include multiple sets of processing circuitry 910, computer-readable storage medium 940, radio circuitry 930, and/or antenna 920 for different wireless technologies integrated into wireless device 610, such as, for example, GSM, WCDMA, LTE, NR, WiFi, or Bluetooth wireless technologies. These wireless technologies may be integrated into the same or different chipsets and other components within wireless device 610.

Figure 10:
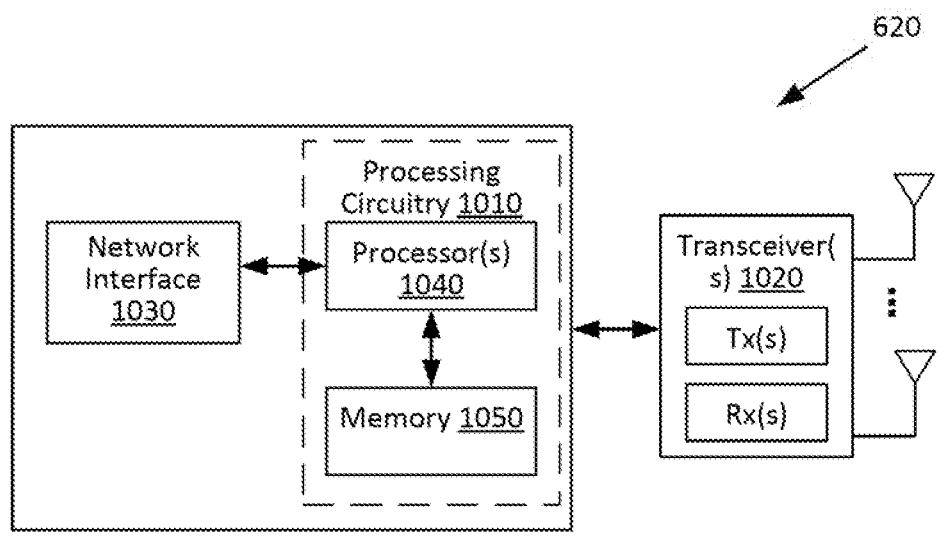
FIG. 10 is a schematic illustration of a radio access node, according to an embodiment.

FIG. 10 is a block diagram of an exemplary radio access node 620, which can be a base station or eNB for example, in accordance with certain embodiments. Radio access node 620 includes processing circuitry 1010, one or more of a transceiver 1020 and a network interface 1030. The circuitry 1010 may include one or more (node) processors 1040, and memory 1050. In some embodiments, the transceiver 1020 facilitates transmitting wireless signals to and receiving wireless signals from wireless device 610 (e.g., via an antenna), the one or more processors 1040 executes instructions to provide some or all of the functionalities described above as being provided by the radio access node 620, the memory 1050 stores the instructions for execution by the one or more processors 1040, and the network interface 1030 communicates signals to backend network components, such as a gateway, switch, router, Internet, Public Switched Telephone Network (PSTN), core network nodes or radio network controllers, etc.

The one or more processors 1040 may include any suitable combination of hardware and software implemented in one or more modules to execute instructions and manipulate data to perform some or all of the described functions of radio access node 620, such as those described above. For example, the processing circuitry 1010 (and the processors 1040) perform all the steps and embodiments of methods 800 and 1400. In some embodiments, the one or more processors 1040 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 1040 may comprise one or more of the modules discussed below with respect to FIG. 12.

The memory 1050 is generally operable to store instructions, such as a computer program, software, an application including one or more of logic, rules, algorithms, code, tables, etc. and/or other instructions capable of being executed by one or more processors 1040. Examples of memory 1050 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 1030 is communicatively coupled to the one or more processors 1040 and may refer to any suitable device operable to receive input for the radio access node 620, send output from the radio access node 620, perform suitable processing of the input or output or both, communicate to other devices, or any combination of the preceding. The network interface 1030 may include appropriate hardware (e.g., port, modem, network interface card, etc.) and software, including protocol conversion and data processing capabilities, to communicate through a network.

Other embodiments of the radio access node 620 may include additional components beyond those shown in FIG. 10 that may be responsible for providing certain aspects of a radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 9-10 may be included in other network nodes (such as core network node 640). Other network nodes may optionally include or not include a wireless interface (such as the transceiver described in FIGS. 9-10). Functionalities described may reside within the same radio node or network node or may be distributed across a plurality of radios nodes and network nodes.

Figure 11:
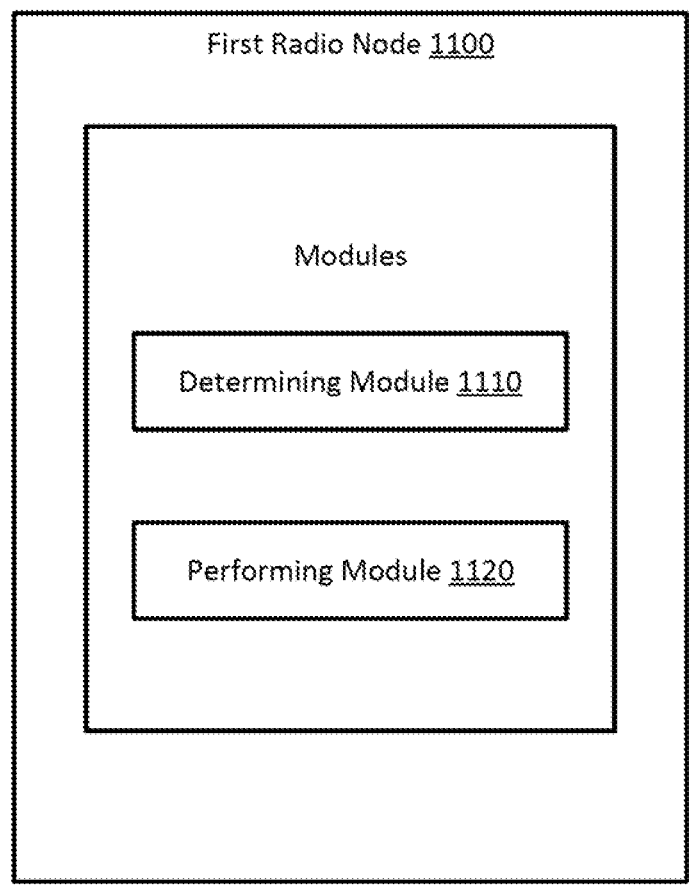
FIG. 11 is a schematic illustration of a wireless device or first radio node, according to another embodiment.

FIG. 11 illustrates an example of a first radio node 1100 in accordance with certain embodiments. The first radio node 1100 could be a wireless device 610. The first radio node 1100 may include a determining module 1110 and a performing module 1120. Optionally, it can also include an indicating module (not shown in FIG. 11, for performing step 730 of FIG. 7, for example).

In certain embodiments, the determining module 1110 may perform a combination of steps that may include steps such as Step 710 in FIG. 7.

Figure 13:
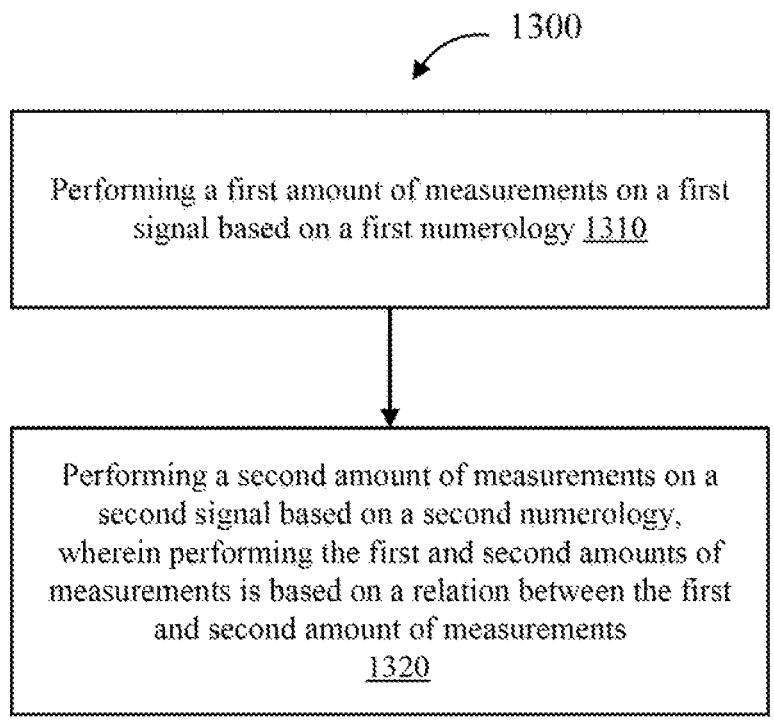
FIG. 13 is a flow chart of a method for performing measurements in a communication network, according to an embodiment.

In certain embodiments, the performing module 1120 may perform a combination of steps that may include steps such as Step 720 in FIG. 7, and steps (or blocks) 1310 and 1320 in FIG. 13.

In certain embodiments, the determining module 1110 and the performing module 1120 may be implemented using one or more processors, such as described with respect to FIG. 9. The modules may be integrated or separated in any manner suitable for performing the described functionality.

Figure 12:
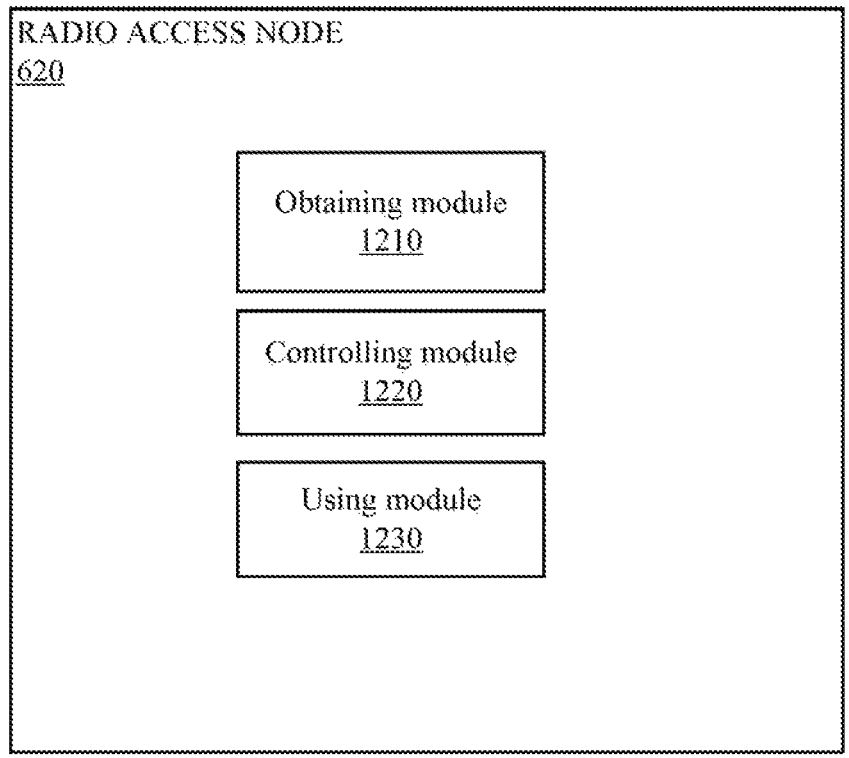
FIG. 12 is a schematic illustration of a radio access node, according to another embodiment.

FIG. 12 illustrates an example of the radio access node 620 (or second radio node) in accordance with certain embodiments. The radio access node 620 may include an obtaining module 1210, a controlling module 1220 and a using module 1230. Optionally, it can also include an indicating module (not shown in FIG. 12, for performing step 840 of FIG. 8, for example).

Figure 14:
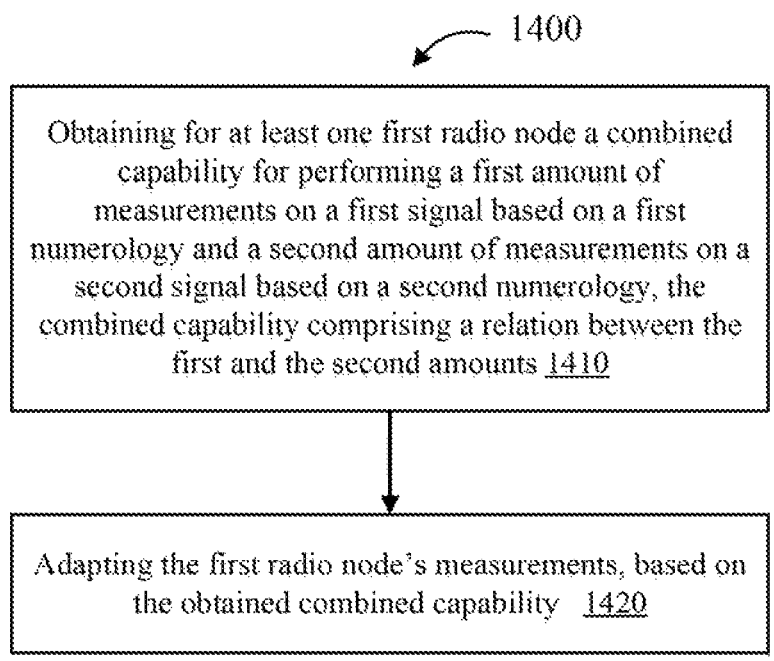
FIG. 14 is a flow chart of a method for controlling measurements in a communication network, according to an embodiment.

In certain embodiments, the obtaining module 1210 may perform a combination of steps that may include steps such as Step 810 in FIG. 8 and step (or block 1410) in FIG. 14.

In certain embodiments, the controlling module 1220 may perform a combination of steps that may include steps such as Step 820 in FIG. 8 and step (or block) 1420 in FIG. 14.

In certain embodiments, the using module 1230 may perform a combination of steps that may include steps such as Step 830 in FIG. 8.

In certain embodiments, the obtaining module 1210, the controlling module 1220 and the using module 1230 may be implemented using one or more processors, such as described with respect to FIG. 10. The modules may be integrated or separated in any manner suitable for performing the described functionality.

It should be noted that according to some embodiments, virtualized implementations of the wireless device 610 of FIG. 9 and a radio node 1100 of FIG. 11 and the radio access node 620 of FIGS. 10 and 12 are possible. As used herein, a "virtualized" network node (e.g., a virtualized base station or a virtualized radio access node) is an implementation of the network node in which at least a portion of the functionality of the network is implemented as a virtual component (e.g., via a virtual machine(s) or container(s) executing on a physical processing node(s) in a network(s)). The functions of the wireless device 610 and radio access node

620 (described hereinabove) are implemented at the one or more processing circuitry 910 and 1010 respectively or distributed across a cloud computing system. In some particular embodiments, some or all of the functions of the wireless device 610 and radio access node 620 (described herein) are implemented as virtual components executed by one or more virtual machines implemented in a virtual environment(s) hosted by processing node(s).

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other. Furthermore, the described embodiments are not limited to the described radio access technologies (e.g., LTE, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:

| | |
|---|---|
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CP | Cyclic Prefix |
| CPICH | Common Pilot Channel |
| CPICH Ec/No | CPICH Received energy per chip divided by the power density in the band |
| CQI | Channel Quality information |
| CRC | Cyclic Redundancy Check |
| C-RNTI | Cell RNTI |
| CSI | Channel State Information |
| DCCH | Dedicated Control Channel |
| DL | Downlink |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| GSM | Global System for Mobile communication |
| gNB | Base station in NR |
| HSPA | High Speed Packet Access |
| HRPD | High Rate Packet Data |
| LPP | LTE Positioning Protocol |
| LIE | Long Term Evolution |
| MAC | Medium Access Control |
| MDT | Minimization of Drive tests |
| MME | Mobility Management Entity |
| MSC | Mobile Switching center |
| NPDCCH | Narrowband Physical Downlink Control CHannel |
| NR | New Radio |
| OCNG | OFDMA Channel Noise Generator |
| OFDM | Orthogonal Frequency Division Multiplexing |
| OFDMA ON | Orthogonal Frequency Division Multiple Access |
| OSS | Opemtions Support System |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator CHannel |
| PDCCH | Physical Downlink Control Channel |
| PDCH | Physical Data CHannel |
| PDSCH | Physical Downlink Shared Channel |
| PGW | Packet Gateway |
| PHICH | Physical Hybrid-ARQ Indicator CHannel |
| PLMN | Public Land Mobile Network |
| PMI | Precoder Matrix Indicator |
| PRACH | Physical Random Access CHannel |
| PRS | Positioning Reference Signal |
| PSS | Primary Synchronization Signal |
| PUCCH | Physical Uplink Control CHannel |
| PUSCH | Physical Uplink Shared Channel |
| RB | Resource Block |
| RLM | Radio Link Management |
| RRC | Radio Resource Control |
| RSCP | Received Signal Code Power |
| RSRP | Reference Signal Received Power |
| RSRQ | Reference Signal Received Quality |
| RSSI | Received Signal Strength Indicator |
| RSTD | Reference Signal Time Difference |
| RRC | Radio Resource Control |
| RRM | Radio Resource Management |
| Rx | Receive |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal Noise Ratio |
| SON | Self-Organizing Network |
| SS | Synchronization Signal |

Some of the abbreviations used in this disclosure include:

| | |
|---|---|
| SSS | Secondary Synchronization Signal |
| TDD | Time Division Duplex |
| TRP | Transmission and Reception Point |
| TTI | Transmission Time Interval |
| UE | User Equipment |
| Tx | Transmit |
| UL | Uplink |
| USB | Universal Serial Bus |
| UMTS | Universal Mobile Telecommunication System |
| UTRA | Universal Terrestrial Radio Access |
| UTRAN | Universal Terrestrial Radio Access Network |
| WCDMA | Wide CDMA |
| WLAN | Wireless Local Area Network |

EXAMPLE EMBODIMENTS

1. A method in a first radio node, the method comprising:
  determining the first radio node's combined capability comprising a first amount of measurements based on a first numerology and a second amount of measurements based on a second numerology; and
  performing one or more operations, based on the determined combined capability.
2. The method of example 1, wherein the first amount of measurements and the second amount of measurements depend on whether the measurements are beamformed or non-beamformed.
3. The method of example 1 or 2, further comprising indicating the determined combined capability to at least one second node.
4. The method of any of examples 1 to 3, wherein the combined capability is determined based on one or more of:
  A pre-defined value or a set of values;
  A pre-defined rule;
  One or more conditions;
  A message from another node; and
  A minimum requirement or condition on one of the beamformed and non-beamformed measurements.
5. The method of any of examples 1 to 4, wherein performing one or more operations comprises performing adaptively to the combined capability.
6. The method of example 3, wherein indicating further comprises indicating the determined combined capability via unicast, multicast or broadcast.
7. The method of example 3, wherein the indication is based upon a request, or in an unsolicited manner.
8. A first radio node comprising circuitry, the first radio node operable to perform any one or more of the methods of examples 1-7.
9. The first radio node of example 8, the circuitry comprising memory and one or more processors.
10. A computer program product comprising a non-transitory computer readable storage medium having computer readable program code embodied in the medium, the computer readable program code comprising computer readable code to perform any one or more of the methods of examples 1-7.
11. A method in a second radio node, the method comprising:
  obtaining for at least one first radio node a combined capability comprising a first amount of measurements based on a first numerology and a second amount of measurements based on a second numerology;
  controlling the first radio node's operation, based on the determined combined capability; and
  using the obtained capability for one or more operational tasks.
12. The method of example 11, wherein the first amount of measurements and the second amount of measurements depend on whether the measurements are beamformed or non-beamformed.
13. The method of examples 11 or 12, further comprising indicating the determined combined capability to at least one third node.
14. A second radio node comprising circuitry, the second radio node operable to perform any one or more of the methods of examples 11-13.
15. The second radio node of example 14, the circuitry comprising memory and one or more processors.
16. A computer program product comprising a non-transitory computer readable storage medium having computer readable program code embodied in the medium, the computer readable program code comprising computer readable code to perform any one or more of the methods of examples 11-13.
17. A radio node including circuitry containing instructions which, when executed, cause the first radio node or the second radio node to perform any of the methods of the example embodiments described above.
18. A non-transitory computer readable memory configured to store executable instructions for a radio node, the executable instructions when executed by one or more processors cause the first radio node or second radio node to perform any of the methods of the example embodiments described above.

What is claimed is:

1. A method in a first radio node for performing measurements in a communication network, the method comprising:
  determining a combined capability of the first radio node, the combined capability comprising capability of the first radio node to perform simultaneously measurements based on a first numerology and measurements based on a second numerology;
  performing a first amount of measurements on a first signal based on the first numerology; and
  performing a second amount of measurements on a second signal based on the second numerology;
  wherein performing the second amount of measurements is based on a difference between the first numerology and second numerology being superior to a value.
2. The method of claim 1, further comprising performing radio measurements, based on the relation between the first numerology and second numerology.
3. The method of claim 1, wherein the first amount of measurements and the second amount of measurements are performed in parallel.
4. The method of claim 1, wherein the first amount of measurements and the second amount of measurements are performed in separate time resources.
5. The method of claim 1, wherein the first amount of measurements and the second amount of measurements are performed over a measurement time T0 which is a function of a first measurement time T1 over which one or more measurements based on the first numerology are performed and a second measurement time T2 over which one or more measurements based on the second numerology are performed.
6. The method of claim 1, further comprising sending an indication of the determined capability to at least one second node.

7. The method of claim 1, wherein a relation between the first and second amounts of measurements is different dependent on whether the first amount and the second amount of measurements are performed in non-overlapping time resources or in the same time resources.

8. The method of claim 1, wherein the first numerology and the second numerology are any one or more of: subcarrier spacing, number of subcarriers per resource block, cyclic prefix length, number of resource blocks within the bandwidth, subframe duration, Transmission Time Interval (TTI) duration, slot duration and number of symbols within a certain time unit.

9. A first radio node for performing measurements in a communication network, the first radio node comprising a processing circuitry configured to:
determine a combined capability of the first radio node, the combined capability comprising capability of the first radio node to perform simultaneously measurements based on a first numerology and measurements based on a second numerology;
perform a first amount of measurements on a first signal based on the first numerology; and
perform a second amount of measurements on a second signal based on the second numerology;
wherein performing the second amount of measurements is based on a difference between the first numerology and second numerology being superior to a value.

10. The first radio node of claim 9, wherein the processing circuitry is configured to perform radio measurements, based on the relation between the first numerology and second numerology.

11. The first radio node of claim 9, wherein the processing circuitry is configured to perform the first amount of measurements and the second amount of measurements in parallel.

12. The first radio node of claim 9, wherein the processing circuitry is configured to perform the first amount of measurements and the second amount of measurements in separate time resources.

13. The first radio node of claim 9, wherein the processing circuitry is configured to perform the first amount of measurements and the second amount of measurements over a measurement time T0 which is a function of a first measurement time T1 over which one or more measurements based on the first numerology are performed and a second measurement time T2 over which one or more measurements based on the second numerology are performed.

14. The first radio node of claim 9, wherein the processing circuitry is configured to further send an indication of the determined capability to at least one second node.

15. The first radio of claim 9, wherein a relation between the first and second amounts of measurements is different dependent on whether the first amount and the second amount of measurements are performed in non-overlapping time resources or in the same time resources.

16. The first radio node of claim 9, wherein the first numerology and the second numerology are any one or more of: subcarrier spacing, number of subcarriers per resource block, cyclic prefix length, number of resource blocks within the bandwidth, subframe duration, Transmission Time Interval (TTI) duration, slot duration and number of symbols within a certain time unit.

17. A method in a second radio node for controlling measurements in a communication network, the method comprising:
obtaining for a first radio node a combined capability of the first radio node, the combined capability comprises capability of the first radio node to perform simultaneously a first amount of measurements on a first signal based on a first numerology and a second amount of measurements on a second signal based on a second numerology, the combined capability further comprising a relation between the first and the second numerologies; and
adapting the first radio node's measurements, based on the obtained combined capability, wherein adapting the first node's measurements comprises performing the second amount of measurements based on a difference between the first numerology and second numerology being superior to a value.

18. The method of claim 17, further comprising sending a message to the first radio node, the message comprising the combined capability for configuring the measurements based on the combined capability.

19. A second node for controlling measurements in a communication network, the second node comprising a processing circuitry configured to:
obtain for a first radio node a combined capability of the first radio node, the combined capability comprises capability of the first radio node to perform a first amount of measurements on a first signal based on a first numerology and a second amount of measurements on a second signal based on a second numerology, the combined capability further comprising a relation between the first and the second numerologies; and
adapt the first radio node's measurements, based on the obtained combined capability, wherein adapting the first node's measurements comprises performing the second amount of measurements based on a difference between the first numerology and second numerology being superior to a value.

20. The second node of claim 19, wherein the processing circuitry is further configured to send a message to the first radio node, the message comprising the combined capability for configuring the measurements based on the combined capability.

* * * * *